United States Patent [19]
Grosseau

[11] 3,851,930
[45] Dec. 3, 1974

[54] BRAKING MECHANISM HAVING AN ANTI-LOCKING SYSTEM

[75] Inventor: Albert Grosseau, Chaville, France

[73] Assignee: Societe Anonyme Automobiles Citroen, Paris, France

[22] Filed: Mar. 7, 1973

[21] Appl. No.: 339,009

[30] Foreign Application Priority Data
Mar. 9, 1972 France .............................. 72.8306

[52] U.S. Cl............................ 303/21 F, 188/181 A
[51] Int. Cl............................................... B60t 8/06
[58] Field of Search...................... 303/21 F, 61–63, 303/68–69, 10; 188/181 A, 181 R

[56] References Cited
UNITED STATES PATENTS
| | | | |
|---|---|---|---|
| 2,759,570 | 8/1956 | Shirey | 303/21 F |
| 3,514,162 | 10/1968 | Erlebach et al. | 188/181 A |
| 3,521,934 | 7/1970 | Leiber | 303/21 F |

Primary Examiner—Trygve M. Blix
Assistant Examiner—D. C. Butler
Attorney, Agent, or Firm—Marn & Jangarathis

[57] ABSTRACT

A braking mechanism having an anti-locking system for at least one wheel of a vehicle and comprised of a source of fluid under pressure controlled by the driver, brake operators to receive fluid and connected to a brake of the wheel, a valve having two positions controlled by a member detecting abnormal deceleration of the wheel and capable of connecting the fluid receiving members selectively to the source of fluid under pressure and with a first exhaust pipe including a flow-limiter and a first accumulator interposed between the valve and the flow-limiter. A second exhaust pipe is provided in parallel flow relationship to the first exhaust pipe about the flow-limiter. The second exhaust pipe is comprised of a valve member constituted by a moving member of a second accumulator permanently connected to the brake operators' supply pipe between the controlled valve and the brake operators, which moving member opens the second exhaust pipe when the volume of fluid is minimal.

4 Claims, 2 Drawing Figures

3,851,930

BRAKING MECHANISM HAVING AN ANTI-LOCKING SYSTEM

The present invention relates to an improved braking mechanism with an anti-locking system for at least one wheel of a vehicle.

In known manner, an anti-locking braking mechanism according to the invention is of the type comprising essentially at least one valve operating fully or not at all, able to connect the brake operators either to the source of fluid under pressure or to the exhaust if an abnormal deceleration of the wheel is detected by a device known per se. Nevertheless in order to obtain satisfactory results, it is necessary to modulate the pressure-drop in the brake operators when the latter are connected to the exhaust. It was the object of French Patent No. 2,052,196 filed by the Applicant to fulfil this condition.

The Applicant proposes a supplement with a view to improving the operation of the aforementioned device according to the invention, mainly taking into account the conditions under which a vehicle equipped with braking mechanisms having an anti-locking system are used.

This is the spirit of the present invention which relates to an improved braking mechanism with an anti-locking system for at least one wheel of a vehicle. This device is constituted by a source of fluid under pressure controlled by the driver, by operators receiving said fluid connected to the brake for said wheel, by a valve having two stable positions controlled by a means detecting abnormal deceleration of the wheel said valve is able to connect the receiving members selectively with the source of fluid under pressure and with a first exhaust pipe, said exhaust pipe comprising a flow-limiter and a first accumulator interposed between the controlled valve and the flow-limiter. According to the invention a second exhaust pipe is arranged in parallel with the flow-limiter of the first exhaust pipe, which second exhaust pipe comprises a valve member constituted by the moving member of a second accumulator permanently connected to the circuit supplying the brake operators between the controlled valve and said operators; the said moving member is in its position opening the second pipe when the volume of said damper is minimal.

Advantageously, the second accumulator is constituted by a cylindrical hollow body in which the moving member is a piston slidably mounted defining a chamber with said body connected to the pipe supplying the brake operators between the controlled valve and said members.

Spring members are connected between said piston and said body and tend to keep said piston in its position opening the second pipe by making the volume of the said chamber minimal.

Moreover, the emptying of the first accumulator takes place advantageously through the intermediary of a valve having two positions determined by the two said positions of the controlled valve.

Finally, in an advantageous embodiment of a device according to the invention, the accumulator is contained in the piston of the second accumulator.

The invention will be better understood and secondary features as well as their advantages will become apparent from the detailed description given hereafter of an embodiment according to the invention, as an example which is in no way limiting.

Reference is made to the accompanying drawings in which.

Figure 1:
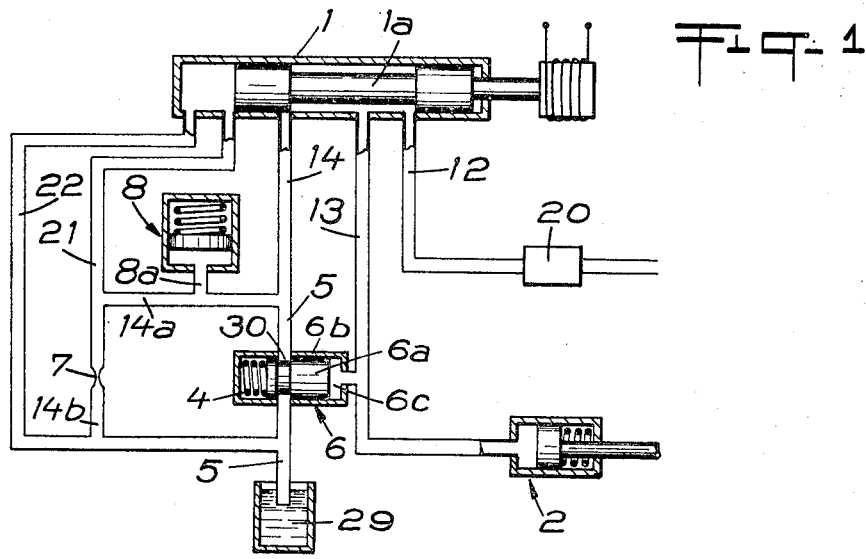
FIG. 1 is a diagram of a first embodiment of a device according to the invention.

In FIG. 1 brake operators connected to the brake of a vehicle wheel are illustrated by the brake cylinder 2. A valve 1 is also shown and is controlled by a means for detecting abnormal deceleration of the wheel, for example known per se.

Three main pipes are connected to the valve 1, the pipe 12 connected to the source of fluid under pressure through the intermediary of a filter 20, the pipe 13 connected to the brake cylinder 2, the exhaust pipe 14 which divides into two pipes, the first pipe 5 connected to the fluid reservoir 29 to which it returns and comprising a valve member 6a which will be defined hereafter, the second being the pipe 14a to which is connected by a pipe 8a an accumulator 8 described in the aforementioned patent filed by the Applicant.

The pipe 14a is extended by a pipe 14b provided with a flow-limiter 7 and returning to the fluid reservoir 29.

Two secondary pipes are connected to the valve 1, the pipe 21 connected to the junction of the said pipes 14a and 14b and the pipe 22 connected to the fluid reservoir 29 to which it returns.

The said valve member 6a is the piston of an accumulator 6, comprising a groove 30 able to be connected to the pipe 5, which piston is subjected at one of its ends to the action of a calibrated spring 4 while the other end defines with the body 6b of the accumulator 6 a chamber 6c connected to the pipe 13 between the controlled valve 1 and the receiving members 2.

Finally it should be noted that depending on the position of the slide 1a of the valve 2 in the body of said valve, either the pipe 12 is connected to the pipe 13 and the pipe 21 to the pipe 22 or the pipe 13 is connected to the pipe 14, the pipes 12 and 21 thus being closed.

Figure 2:
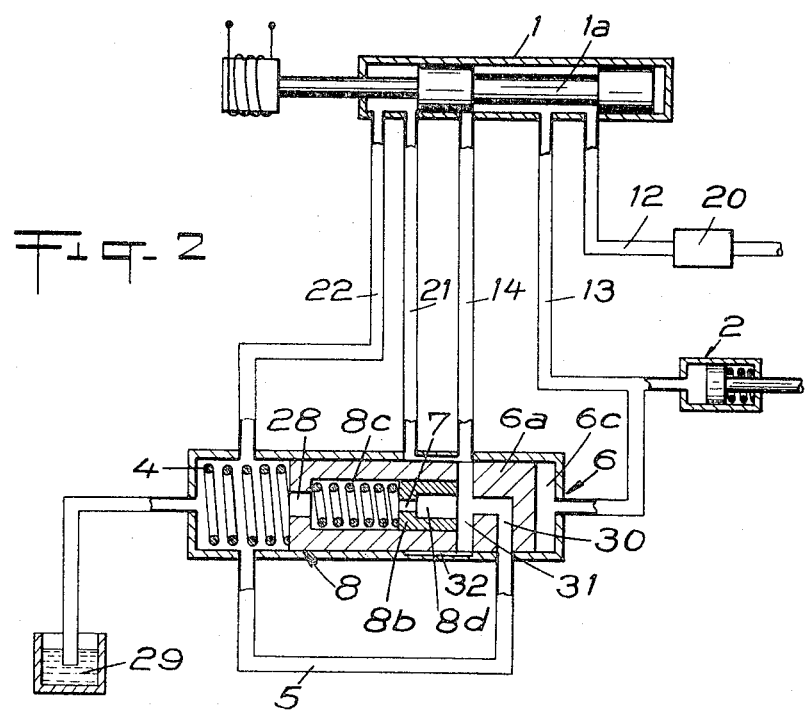
FIG. 2 is the diagram of a second embodiment of a device according to the invention.

In FIG. 2, most of the parts already mentioned are shown. However, it will be noted that the accumulator 8 is incorporated in the piston 6a of the accumulator 6. In this arrangement, the said accumulator 8 comprises a piston 8b subjected to the action of a spring 8c on one of its sides, while the other side defines a chamber 8d connected to the pipe 14 by the channel 31 contained in the piston 6a and the groove 32 provided in the body of the damper 6 to which said pipe 14 is connected. The two sides of said piston 8b are connected by an aperture 7 which forms a flow-limiter.

Moreover, the piston 6a of the accumulator 6 comprises a pipe 30 connected to the channel 31 able to be connected to the connection of the pipe 5 to the body of said damper 6 depending on the position of said piston 6a. An aperture 28 in the said piston 6a connects the chamber of the accumulator 8 containing the spring 8c to the exhaust.

In the examples illustrated in FIGS. 1 and 2 it will be noted that the pipes 21 and 22 have advantageously been connected to the valve 1 to simplify the construction of the device, which valve 1, as regards the said pipes, fulfills a function independent of that which consists of selectively establishing connections between the pipes 12, 13 and 14. It is thus possible to imagine a variation of this embodiment in which the connection between the pipes 21 and 22 would be established or interrupted by a valve member having two positions other than the valve 1 but the two said positions of which would be controlled by any means depending on the positions of the slide 1a of the valve 1. The operation of the device described hereafter will facilitate an understanding of the invention.

At the time of braking, the fluid coming from the source of fluid under pressure controlled by the driver enters the pipe 12. The position of the slide 1a of the valve 1 is such that it allows the flow of said fluid through the pipe 13 to the brake cylinder 2. When the pressure of the fluid admitted into the cylinder 2 exceeds a certain threshold, it is sufficient to push the piston 6a of the accumulator 6, permanently connected to the pipe 13, against the action of the calibrated spring 4, the value of whose calibration defines the said pressure threshold.

The fluid pressure creating a locking of the wheel may thus be located short of or beyond the said threshold depending on the condition of the ground and thus on the grip of the wheel on the ground.

If locking is imminent, the detection device acts on the slide 1a of the valve 1 which connects the pipe 13 to the pipe 14 thus closing the pipe 12.

In the case where the said wheel grips the ground slightly, the locking pressure is short of the threshold defined by the calibration of the spring 4 of the accumulator 6. The piston 6a of said accumulator thus remains in a position connecting the groove 30 which it comprises to the pipe 5. The fluid contained in the cylinder 2 and the pipe 13 may thus escape through the pipe 14 and pipe 5, said groove 30 leaving the passage to the fluid reservoir 29 free (FIG. 1).

The mechanism described with regard to FIG. 2 operates in substantially the same manner as the former.

The pipe 14 conveys the fluid discharged by the groove 32 then, through the pipe 21 preferably into the pipe 30, which is connected to the pipe 5 returning to the reservoir 29 by the said position of the piston 6a.

Thus the connection to the exhaust of the brake operators is abrupt. This has the advantage of immediately unlocking the wheel, the starting-up of which, due to the slight grip, will necessitate a greater amount of time than that needed with normal grip.

In the case of a good grip of the wheel on the ground, the locking pressure is beyond the threshold defined by the calibration of the spring 4. The piston 6a of the accumulator 6 is thus urged against the action of said spring 4 and the connection of the groove 30 to the pipe 5 (FIG. 1) or of the pipe 30 to the pipe 5 (FIG. 2) is interrupted.

In the embodiment illustrated in FIG. 1, the fluid returning to the exhaust through the pipe 14 thus uses the pipe 14a and fills the accumulator 8 through the pipe 8a. It will be noted that the slide 1a of the valve 1 in its position of exhausting the brake cylinder 2 closes the pipe 21 and due to this breaks any direct connection between said pipe 14a and the reservoir 29.

Generally, the filling of said accumulator 8 causes a sufficient pressure drop to allow the unlocking of the wheel. The fluid returning to the exhaust may continue to flow through the pipe 14b and the flow-limiter 7 to the reservoir 29 until the wheel is rotating sufficiently to cut the detection signal.

Since the winding of the valve 1 is no longer excited, the slide 1a of the valve 1 cuts the connection of the braking members to the exhaust and restores the supply thereto by the source of fluid under pressure. Moreover, in this action, said slide 1a connects the pipes 21 and 22 which allows a rapid emptying of the accumulator 8 thus avoiding the passage of fluid through the flow-limiter 7.

With regard to FIG. 2, still in the case of good grip, after having filled the accumulator 8, the fluid may, if necessary, flow towards the reservoir 29 through the aperture 28 in the piston 6a. Moreover, the emptying of said accumulator 8 takes place rapidly after unlocking the wheel, through the groove 32 and the pipes 21 and 22, which groove 32 is constructed so as to allow said accumulator 8 to be permanently connected to the pipes 14 and 21 whatever the position of the piston 6a.

It will be readily understood that with the mechanisms proposed above it is possible to adjust the pressure-drop to the braking conditions of the vehicle in a simple manner and in particular depending on the coefficient of adhesion encountered locally.

On the other hand, the accumulator 6 makes it possible to complete the elasticity of the materials composing the braking circuit of the vehicle. In fact the fluid forced back at the time of the exhausting is that contained in the increase in volume of the pipes of the braking circuit under the effect of the braking pressure. It may be that this increase in volume is not sufficient and that there is little fluid forced back to be exhausted due to the materials or the front or rear braking circuit in question.

Now a good operation of the device necessitates a certain volume of fluid forced back. The said accumulator 6, by forming a reserve of fluid under pressure, if necessary, makes it possible to apply an advantageous additional amount of fluid at the time of the exhausting, the maximum volume of this reserve being able to assume several values depending on the adjustment of the spring 4.

In addition, a mechanism of this type facilitates rapid emptying of the accumulator 8 and increases the availability of it for a new operating cycle of the anti-locking system, thus connecting the receiving members to the exhaust.

It will also have been noted that if the preceding description has been given with reference to a single wheel, it is naturally possible to detect the locking of each of the wheels or a group of wheels of a vehicle. In this case, the brake operators of said group of wheels are supplied by a single circuit comprising a common return to the fluid reservoir 29 in which are provided a single valve member, a single accumulator and a single flow-limiter.

The invention is not limited to the embodiment which has been described but on the contrary includes all variations which could be applied thereto without diverging from its framework or spirit.

What is claimed is:

1. Improved braking mechanism having an anti-locking system for at least one wheel of a vehicle comprised of a source of fluid under pressure controlled by the driver, brake operator means receiving said fluid and connected to a brake of said wheel, a valve having two positions controlled by a means detecting abnormal deceleration of said wheel and able to place said brake operator means selectively in fluid communication with said source of fluid under pressure and with a first exhaust pipe including a flow-limiter and a first accumulator wherein said first accumulator is interposed between said control valve and said flow-limiter, the improvement characterized by a second exhaust pipe connected to said first exhaust pipe in parallel flow to said flow-limiter, said second pipe comprising a valve member constituted by a moving member of a second accumulator connected to a pipe supplying said brake operator means between said control valve and said brake operator means, said moving member being in a position to open the second pipe when the volume of said accumulator is minimal.

2. The device as defined by claim 1 wherein said second accumulator is comprised of a cylindrical hollow body and wherein said moving member is a piston slidably mounted in said body and defining a chamber with said body, said chamber being connected to said pipe supplying said brake operator means between said control valve and said brake operator means said second accumulator including a spring member means disposed between said piston and said body, said spring member means tending to keep said piston in a position opening said second pipe to maintain the volume of the said chamber minimal.

3. The device as defined by claim 2, wherein said first accumulator is emptied by means of a valve having two positions defined by the positions of said controlled valve.

4. The device as defined by claim 3 wherein said first accumulator is provided by a piston of said second accumulator.

* * * * *